United States Patent
Narukawa

(10) Patent No.: US 7,854,872 B2
(45) Date of Patent: Dec. 21, 2010

(54) SOLUTION CASTING METHOD FOR PRODUCING POLYMER FILM AND SUCTION ROLLER USED THEREFOR

(75) Inventor: Yoshiaki Narukawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 59 days.

(21) Appl. No.: 11/597,704

(22) PCT Filed: May 24, 2005

(86) PCT No.: PCT/JP2005/009835

§ 371 (c)(1),
(2), (4) Date: Nov. 28, 2006

(87) PCT Pub. No.: WO2005/115714

PCT Pub. Date: Dec. 8, 2005

(65) Prior Publication Data

US 2007/0228607 A1    Oct. 4, 2007

(30) Foreign Application Priority Data

May 28, 2004  (JP) .............................. 2004-160159

(51) Int. Cl.
*B29C 31/00* (2006.01)

(52) U.S. Cl. .......................... 264/216; 264/316; 425/89

(58) Field of Classification Search .................. 425/89; 264/216

See application file for complete search history.

(56) References Cited

U.S. PATENT DOCUMENTS

| | | | | |
|---|---|---|---|---|
| 3,471,594 A | * | 10/1969 | Masaru et al. | 264/210.6 |
| 5,037,587 A | * | 8/1991 | Saruwatari et al. | 264/466 |
| 6,582,645 B2 | * | 6/2003 | Takeda | 264/207 |

FOREIGN PATENT DOCUMENTS

| | | |
|---|---|---|
| JP | 7-223763 A | 8/1995 |
| JP | 8-25459 A | 1/1996 |
| JP | 2000-296529 A | 10/2000 |
| JP | 2002-194107 A | 7/2002 |

(Continued)

OTHER PUBLICATIONS

Hardness Testing, Dec. 4, 2004, www.key-to-steel.com, http://web.archive.org.*

(Continued)

*Primary Examiner*—Jennifer K Michener
*Assistant Examiner*—Magali P Slawski
(74) *Attorney, Agent, or Firm*—Sughrue Mion, PLLC

(57) ABSTRACT

A suction roller (65) is used as a drive roller for feeding a film in a solution casting method. The suction roller (65) has a surface (65a) on which a plurality of circular suction holes (91) is formed. The suction hole (91) has a diameter of 4 mm and a chamfered edge. The width of chamfer is 10% in ratio to the diameter of the hole. The surface (65a) is hardened by chrome plating so as to have a hardness of 900 in Vicars hardness. A roller temperature controller (100) is provided near the suction roller (65) to control the surface temperature of the roller by the air supply. The surface temperature of the suction roller (65) is about 10° C. higher than temperature of the film (61) immediately before contacting to the suction roller (65).

6 Claims, 4 Drawing Sheets

FOREIGN PATENT DOCUMENTS

| JP | 2002292658 A | * | 10/2002 |
|---|---|---|---|
| JP | 2003-94467 A | | 4/2003 |
| JP | 2003-146505 A | | 5/2003 |
| JP | 2004-322352 A | | 11/2004 |

OTHER PUBLICATIONS

WebElements.com: "Nickel," "Bulk properties," retrieved Dec. 5, 2002, available on the Web Archive at http://web.archive.org/web/20021020085817/www.webelements.com/webelements/elements/text/Ni/phys.html, p. 2.*

Groshart, E. "Finishing in the green: Chromium plating replacements" in Metal Finishing, vol. 95, Issue 4, Apr. 1997, pp. 70-72.*

JP 2002-292,658 A, Sugitani et al. (Oct. 2002) machine translation.*

* cited by examiner

SOLUTION CASTING METHOD FOR PRODUCING POLYMER FILM AND SUCTION ROLLER USED THEREFOR

TECHNICAL FIELD

The present invention relates to a solution casting method for producing a polymer film, which is used for a liquid crystal display and the like, and a suction roller used therefor.

BACKGROUND ART

A liquid crystal display (LCD) is generally used for a personal computer, a monitor of a mobile device and a television in view of several merits, such as low voltage, low electric power requirement, miniaturization and thinner shape. Usually, the liquid crystal display is constructed of the liquid crystal cell, an optical compensation sheet and a polarizer. In a technical field of the optical materials, various types of polymer film products are used for protecting a polarizing filter, reducing the coloring of an image and widening a view angle.

As the polymer film preferably used for the LCD, a cellulose acylate film has high birefringence and high retardation value. Since the cellulose acylate film also has a function of a protective film in the polarizing filter, the low-cost and thin liquid crystal display can be supplied in the market.

As already known methods for producing the polymer film, there are a melt-extrusion method in which the polymer is melt with heating and an extrusion thereof is made to obtain the film, and a solution casting method in which a dope containing the polymer, a solvent and the like is prepared and the casting of the dope is made to obtain the film. In a solution casting method, a dope is cast onto a support to form a casting film. Then the casting film is peeled as a film when having a self-supporting property. Thereafter the solvent within the film is vaporized by a drying process, and the film is wound up.

In the solution casting method, the peeled polymer film before wound up is applied various processes including the drying process and a process of cutting side edge portions of the film. While being applied these processes, the polymer film is supported and fed by rollers. As the rollers, there are drive rollers and non-drive rollers. The non-drive roller is used for determining a feeding path of the polymer film and increasing a stability of feeding.

The drive roller is used for transmitting the driving force to the polymer film so as to feed it downstream. As the drive roller, a suction roller is usually used. While feeding of the film, different film tensions may be required in the different processes, such as the casting process, the peeling process, the drying process and the winding process. In this case, the suction roller applies the driving force to the film so as to change the film tension. The suction roller has a plurality of suction holes on a contact surface thereof so as to suck the polymer film thereon while the feeding.

When the suction roller is used for feeding the film, since a complex power whose direction cannot identify acts on the film, the film is likely to be deformed. Further, the film can be deformed by the difference of the film tensions between upstream and downstream from the suction roller. In addition, when the polymer film slips, contracts or becomes deformed while contacting on edges of the suction holes, microscopic flaws are occurred on the film.

Recently, since the LCD becomes to have higher brightness, the flaws on the polymer film used as the protective film or the like are likely to be observed even if the flaw is microscopic. In case that the polymer film is used as the protective film in the polarizing filter of the LCD in which illumination light from a backlight passes through the polarizing filter, if there are microscopic flaws on the film, the flaws diffusely reflects the illumination light so that the quality of the displayed image is considerably worsen.

In considering this problem, Japanese Patent Laid-Open Publication No. 2002-194107 discloses a method for reducing occurrence of the flaws on the cellulose acylate film, in which the film is produced such that a difference between a surface temperature of a drive roller and the film temperature is small. Japanese Patent Laid-Open Publication No. 2003-094467 discloses a method for producing the film in which the suction roller has suction holes whose diameter is smaller than that of the conventional suction hole.

However, in the method of the Publication 2002-194107, although the occurrence of the flaws on the film can be reduced in a certain level, the drying process is not effectively performed because the drying temperature can be varied in a limited range and cannot be high. To dry the film, preferably the drying temperature is as well as high so as to vaporize the solvent within the film. In the method of the Publication 2003-094467, while the suction roller has no flaw on its surface, the occurrence of the flaws on the film can be reduced because the film is hardly deformed. However, when the flaws are occurred on the suction roller by long time use, the flaws on the roller cause the occurrence of the flaws on the film.

An object of the present invention is to provide a solution casting method for producing a cellulose acylate film, in which flaws on the film are hardly occurred, and a suction roller used therefor.

DISCLOSURE OF INVENTION

In order to achieve the object and the other object, in a solution casting method of the present invention, a dope is cast onto a support to form a casting film. Then the casting film is peeled as a film when having a self-supporting property. Thereafter the film is dried while being fed by a drive roller whose surface is hardened.

The hardening may be performed by hard chrome plating, nitridation, quenching or the like. The degree of hardness is in a range of 500 to 2000, preferably in a range of 800 to 1200 in Vickers hardness.

The drive roller is a suction roller 65 having a plurality of suction holes 91 on its surface. The surface roughness Ry of the roller surface 65a is preferably in a range of 0.3 μm to 1.0 μm, particularly in a range of 0.5 μm to 0.8 μm. The value of the surface roughness Ry is measured in area of the roller surface without the suction hole. A diameter of the suction hole is preferably in a range of 1 mm to 6 mm, particularly in a range of 2 mm to 4 mm. A width of chamfer of the suction hole is preferably in a range of 2% to 20% in ratio to the diameter thereof.

While the suction roller is driven, it is preferable that a surface temperature thereof is controlled. For this purpose, at least one roller temperature controller, which corresponds to the single suction roller, is preferably provided. It is preferable that the roller temperature controller controls the surface temperature of the suction roller so as to be higher than temperature of the film immediately before contacting to the suction roller.

According to the solution casting method of the present application, the production of the cellulose acylate film can be performed with reducing occurrence of the flaws on the film. The film obtained by the method of the present application has favorable optical properties for being used as a protective film in a polarizing filter or the like. In addition, when the film obtained by the method of the present application is used as a component of the polarizing filter or the LCD, the polarizing filter or the LCD having superior optical properties can be obtained.

BEST MODE FOR CARRYING OUT THE INVENTION

Figure 1:
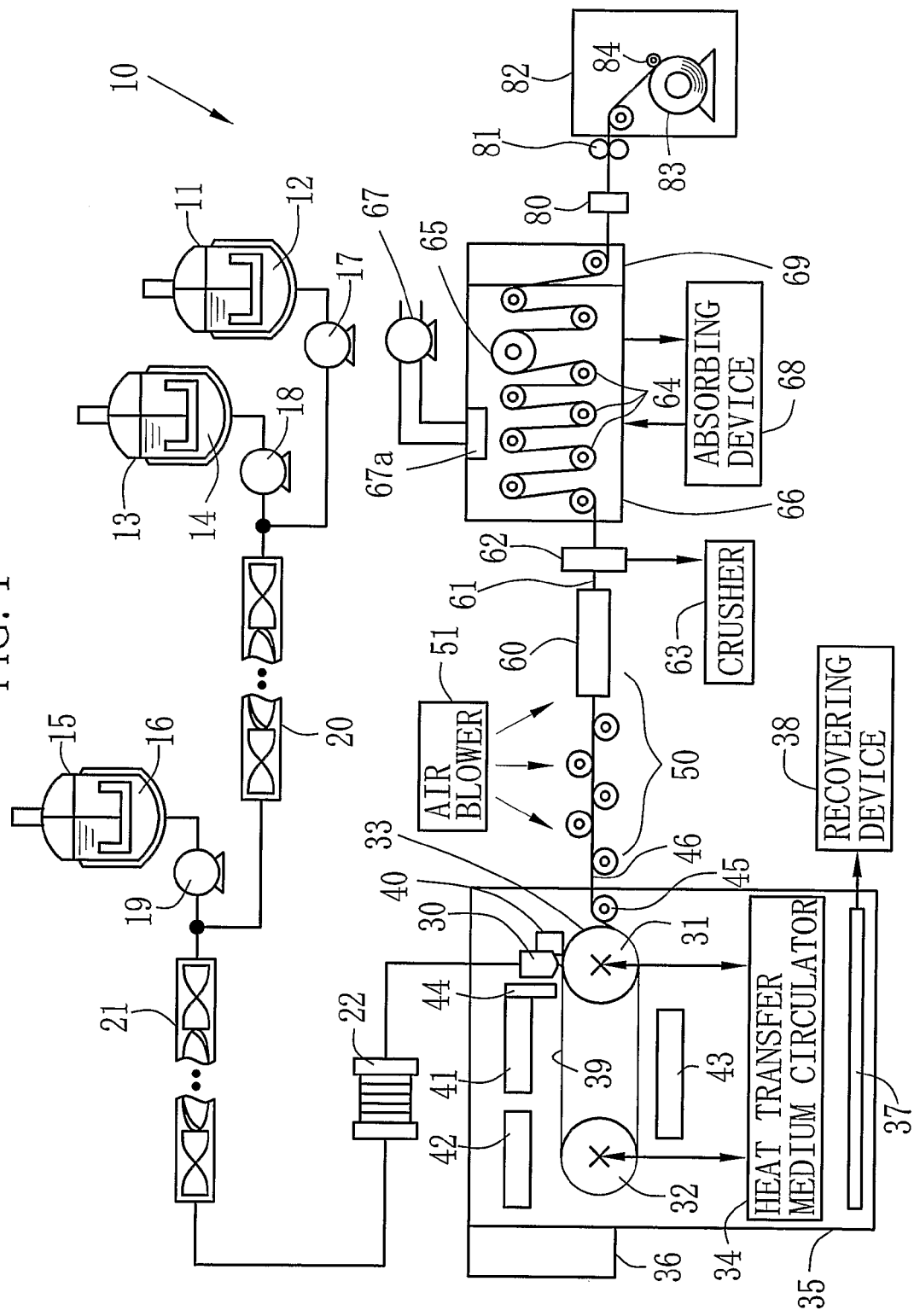
FIG. 1 is a schematic diagram of a film production apparatus in which a solution casting method of the present invention is performed.

In the cellulose acylate to be used in the present invention, the degree of the acyl substitution preferably satisfies all of the following formulae (I)-(III):

$$2.5 \leq A+B \leq 3.0 \quad (I)$$

$$0 \leq A \leq 3.0 \quad (II)$$

$$0 \leq B \leq 2.9 \quad (III)$$

In these formulae, A is a degree of substitution of the hydrogen atom of the hydroxyl group to the acetyl group, and B is a degree of substitution of the hydrogen group to the acyl group having 3-22 carbon atoms. Preferably, at least 90 wt. % of the cellulose acylate particles has diameter from 0.1 mm to 4 mm.

The cellulose is constructed of glucose units making β-1, 4 combination, and each glucose unit has a liberated hydroxyl group at second, third and sixth positions. Cellulose acylate is a polymer in which part or whole of the hydroxyl groups are esterified so that the hydrogen is substituted by acyl groups. The degree of substitution for the acyl groups in cellulose acylate is a degree of esterification at second, third or sixth position in cellulose. Accordingly, when all (100%) of the hydroxyl group at the same position are substituted, the degree of substitution at this position is 1.

When the degrees of substitution for the acyl groups at the second, third or sixth positions are respectively described as DS1, DS2, DS3, the total degree of substitution for the acyl groups at the second, third or sixth positions (namely DS2+DS3+DS6) is preferably in the range of 2.00 to 3.00, and particularly in the range of 2.22 to 2.90, and especially in the range of 2.40 to 2.82. Further, DS6/(DS2+DS3+DS6) is preferably at least 0.32, and particularly 0.322, and especially in the range of 0.324 to 0.340.

The sort of acyl group to be contained in the cellulose acylate of the present invention is may be only one, and two or more sorts of the acyl group may be contained. If the number of the sorts of the acyl groups is at least two, it is preferable that one of the sorts is acetyl group. If the total degree of substitution for the acetyl groups and that for other acyl groups at the second, third or sixth positions are respectively is described as DSA and DSB, the value DSA+DSB is preferably in the range of 2.2 to 2.86, and particularly in the range of 2.40 to 2.80. Further, the DSB is preferably at least 1.50, and especially at least 1.7. Further, in the DSB, the percentage of a substituent at the sixth position is preferably at least 28%, particularly at least 30%, especially at least 31% and most especially at least 32%. Further, the value DSA+DSB at sixth position is at least 0.75, particularly at least 0.80, and especially 0.85. From cellulose acylate satisfying the above conditions, a solution (or dope) having a preferable dissolubility can be prepared. Especially when non-chlorine type organic solvent is used, the adequate dope can be prepared, since the dope can be prepared so as to have a low viscosity and the filterability becomes higher.

The acyl group having at least 2 carbon atoms may be aliphatic group or aryl group, and is not restricted especially. As examples of the cellulose acylate, there are alkylcarbonyl ester, alkenylcarbonyl ester, aromatic carbonyl ester, aromatic alkylcalbonyl ester and the like. Further, the cellulose acylate may be also esters having other substituents. The preferably substituents are propionyl group, butanoyl group, keptanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group and the like. Among them, propionyl group, butanoyl group, dodecanoyl group, octadecanoyl group, t-butanoyl group, oleoyl group, benzoyl group, naphtyl carbonyl group, cinnamoyl group and the like are particularly preferable, and propionyl group and butanoyl group are especially preferable.

Solvent compounds for preparing the dope are aromatic hydrocarbon (for example, benzene toluene and the like), halogenated hydrocarbons (for example, dichloromethane, chloroform, chlorobenzene and the like), alcohols (for example methanol, ethanol, n-propanol, n-butanol, diethylene glycol and the like), ketones (for example acetone, methylethyl ketone and the like), esters (for example, methylacetate, ethylacetate, propylacetate and the like), ethers (for example tetrahydrofuran, methylcellosolve and the like) and the like.

The preferable solvent compounds are the halogenated hydrocarbons having 1 to 7 carbon atoms, and dichloromethane is especially preferable. In view of physical properties such as optical properties, a solubility, a peelability from a support, a mechanical strength of the film and the like, it is preferable to use at least one sorts of the solvent compounds having 1 to 5 carbon atoms with dichloromethane. The content of the alcohols is preferably in the range of 2 wt. % to 25 wt. %, and especially in the range of 5 wt. % to 20 wt. % to total solvent compounds in the solvent. As concrete example of the alcohols, there are methanol, ethanol, n-propanol, isopropanol, n-butanol, and the like. It is preferable to use methanol, ethanol, n-butanol or a mixture thereof.

Recently, in order to reduce the influence on the environment, the solvent containing no dichloromethane is proposed. In this case, the solvent contains ethers with 4 to 12 carbon atoms, ketones with 3 to 12 carbon atoms, esters with 3 to 12 carbon atom, or a mixture of them. The ethers, ketones, esthers may have a cyclic structure. At least one solvent compound having at least two functional groups thereof (—O—, —CO—, —COO—) may be contained in the organic solvent. In this case, the number of carbon atoms may be at most the above values for each compound of the functional group. Note that the organic solvent compound may have other functional group such as alcoholic hydroxyl group.

The cellulose acylate is described in detail in the Japanese patent application No. 2004-264464, and the description of this application can be applied to the present invention. Further, as the solvent of cellulose acylate and other additives, this application discloses plasticizers, deteoriation inhibitor, UV-absorbing agent, optical anisotropy controlling agent, retardation controller, dye, matting agent, release agent and release promoter in detail.

In the present invention, preferably, one or more UV-absorbing agent is preferable to be contained in the film. Since having the dimensional stability, the cellulose acylate film is used in the polarizing filter, the liquid crystal display and the like. In view of the protection of the deterioration of them, the UV-absorbing agent is preferably excellent in absorbing UV-ray whose wave length is equal or less than 370 nm. Further, in view of the displayability of the LCD, the UV-absorbing agent preferably does not absorb visible ray whose wave length is equal or more than 400 nm. As the UV-absorbing agent, there are, for example, oxybenzophenone type compounds, benzotriasol type compounds, salicylic acid ester type compounds, benzophenone type compounds, cyanoacrylate type compounds, nickel complex salt type compounds.

As the preferable UV-absorbing agent, there are
2-(2'-hydroxy-5'-methylphenyl)benzotriazol;
2-(2'-hydroxy-3',5'-di-tert-butylphenyl)benzotriazol;
2-(2'-hydroxy-3'-tert-butyl-5'-methylphenyl)benzotriazol;
2-(2'-hydroxy-3',5'-di-tert-butylphenyl)-5-chlorobenzotriazol;
2-(2'-hydroxy-3'-(3",4",5",6"-tetrahydrophthalimidomethyl)-5'-methylphenyl)benzotriazol;
2,2-methylenebis(4-(1,1,3,3-tetramethylbutyl)-6-(2H-benzotriazol-2-yl)phenol);
2-(2'-hydroxy-3'-tert-butyl-5'-methylphenyl)-5-chlorobenzotriazol;
2,4-dihydroxybenzophenone;
2,2'-dihydroxy-4-metoxybenzophenone;
2-hydroxy-4-metoxy-5-sulfobenzophenone;
bis(2-metoxy-4-hydroxy-5-benzoylphenylmethane);
(2,4-bis-(n-octylthio)-6-(4-hydroxy-3,5-di-tert-butylanylino)-1,3,5-triazine;
2-(2'-hydroxy-3',5'-di-tert-butylphenyl)-5-chlorobenzotriazol;
(2(2'-hydroxy-3',5'-di-tert-amylphenyl)-5-chlorobenzotriazol;
2,6-di-tert-butyl-p-crezol;
pentaerythrityl-tetrakis[3-(3,5-di-tert-butyl-4-hydroxyphenyl)propionate];
triethylene glycol-bis[3-(3-tert-butyl-5-methyl-4-hydroxyphenyl)propionate];
1,6-hexanediol-bis[3-(3,5-di-tert-butyl-4-hydroxyphenyl)propionate],
2,4-bis-(n-octylthio)-6-(4-hydroxy-3,5-di-tert-butylanilino)-1,3,5-triadine;
2,2-thio-diethylenebis[3-(3,5-di-tert-butyl-4-hydroxyphenyl)propionate],
octadecyl-3-(3,5-di-tert-butyl-4-hydroxyphenyl)propionate,
N,N'-hexamethylenebis(3,5-di-tert-butyl-4-hydroxy-hydrocinnamide),
1,3,5-trimethyl-2,4,6-tris(3,5-di-tert-butyl-4-hydroxybenzyl)benzene,
tris-(3,5-di-tert-butyl-4-hydroxybenzyl)-isocianurate and the like. Especially preferable are 2,4-bis-(n-octylthio)-6-(4-hydroxy-3,5-di-tert-butylanylino)-1,3,5-triadine;
2(2'-hydroxy-3',5'-di-tert-butylphenyl)-5-chlorobenzotriazol;
2(2'-hydroxy-3',5'-di-tert-amylphenyl)-5-chlorobenzotriazol;
2,6-di-tert-butyl-p-crezol, pentaerythrityl-tetrakis[3-(3,5-di-tert-butyl-4-hydroxyphenyl)propionate]; and
triethyleneglycol-bis[3-(3-tert-butyl-5-methyl-4-hydroxyphenyl)propionate]. Further, the following compound can be used in combination with the above UV-absorbing agents; for example, metallic nonactivator of hydradine type, such as N,N'-bis[3-(3,5-di-tert-butyl-4-hydroxyphenyl)propionyl]hydradine, processing stabilizers of phosphor type, such as tris(2,4-di-tert-butylphenyl)phosphite and the like. The added amount of these compound is preferably 1 ppm to 2.0 ppm in mass ratio to cellulose acylate, and particularly 10 ppm to 5000 ppm.

Further, it is preferable to use the UV-absorbing agents described in Japanese Patent Laid-Open Publications No. 6-148430 & 7-11056. The UV-absorbing agents preferably used in the present invention have high transparency and high efficiency for preventing the deterioration of the polarizing filter or the liquid crystal elements. Especially preferable are the benzotriazol type UV-absorbing agents which reduces the unnecessary coloring. The quantity of the UV-absorbing agent to be used in not constant and depending on the sorts of the compounds, the conditions of use and so on. However, the quantity is preferably in the range of 0.2 g to 5.0 g, and preferably in the range of 0.4 g to 1.5 g, and especially in the range of 0.6 g to 1.0 g in 1m$^2$ cellulose acylate film.

As the UV-absorbing agents to be used in the present invention, there are optical stabilizer in catalogue of "Adekastab", optical stabilizers and UV-absorbing agents in catalogue of Tinuvin of Ciba Specialty Chemicals Inc., SEESORB, SEENOX, SEETEC and the like in catalogue of SHIPRO KASEI KAISHA, LTD. Further, there are VIOSORB of Kyodo Chemical Co., Ltd and UV-absorbing agents of Yoshitomi Pharmaceut Ind., Ltd.

Japanese Patent Laid-Open Publication No. 2003-043259 discloses the optical film to be used in the polarizing filter and the display device. The film is excellent in color reproducibility and endurance in the illumination of the UV-ray. In the UV-wavelength range, the spectral transmittance of the film is from 50% to 95% at 390 nm and at most 5% at 350 nm of UV-wave.

In the optical properties of celluloseacylate film of the present invention, retardation values Re,Rth are represented by formulae (IV),(V):

$$Re(\lambda)=(nx-ny)\times d;$$ Formula (IV):

$$Rth(\lambda)=\{(nx+ny)/2-nz\}\times d$$ Formula (V)

The retardation values Re,Rth preferably satisfy following formulae (VI),(VII):

$$46\text{ nm} \leq Re(630) \leq 200\text{ nm};$$ Formula (VI):

$$70\text{ nm} \leq Rth(630) \leq 350\text{ nm};$$ Formula (VII):

[In formulae, $Re(\lambda)$ is an in-plane retardation value (unit; nm) at $\lambda$ nm wavelength, $Rth(\lambda)$ is a thickness retardation value (unit; nm) at $\lambda$ nm wavelength. Further, nx is a refractive index in the direction of the slow axis on a film surface, ny is a refractive index in the direction of the fast axis on a film surface, and nz is a refractive index in the thickness direction of the film. Further, d is the film thickness.]

The retardation values especially preferably satisfy following formulae (VIII),(IX):

$$46\text{ nm} \leq Re(630) \leq 100\text{ nm};$$ Formula (VIII):

$$180\text{ nm} \leq Rth(630) \leq 350\text{ nm};$$ Formula (IX):

The optical properties such as the retardation values Re,Rth change depending on a mass variation and a dimension variation caused by a humidity variation and a period in which the high temperature is kept. Preferably, the change of the values Re,Rth are smaller. In order to reduce the change of the values Re,Rth caused by the humidity variation, the moisture permeability and the equilibrium moisture content of the film is made smaller by using not only cellulose acylate whose degree of acylation at $6^{th}$ position is large, but also several sorts of hydrophobic additives (plasticizer, retardation controller, UV-absorbing agent and the like). The moisture permeability to cellulose acylate is preferably from 400 g to 2300 g in 1 square meter at 60° C. and 95% RH for 24 hours. The measured value of the equilibrium moisture content is preferably at most 3.4% at 25° C. and 80% RH. When the humidity at 25° C. varies from 10% RH to 80% RH, the retardation values Re,Rth of the optical properties respectively change at most 12 nm and at most 32 nm. The quantity of the hydrophobic additives is preferably from 10% to 30%, particularly from 12% to 25%, and especially 14.5% to 20% in ratio to that of the cellulose acylate. If the additives is volatile and degradable compounds, the mass variation and size variation of the film occur, which causes the change of the optical properties. Accordingly, after 48 hours passes at 80° C. and 90% RH, the mass variation of the film is preferably at most 5%. Similarly, after 24 hours passes at 60° C. and 95% RH, the size variation of the film is preferably at most 5%. Further, even though the size variation and the mass variation occur, the change of the optical properties becomes smaller when the film has the smaller photoelastic coefficient. Therefore, the photoelastic coefficient is preferably at most $50 \times 10^{-13} cm^2/dyne$.

The producing method of the dope used in the present invention is not restricted especially. An example of the producing method will be described in followings. The main solvent compound is dichloromethane, and the mixture solvent into which the alcohols are added was used. The cellulose acylate and the plasticizers are added to the mixture solvent, and the dissolution with the stirring is made to obtain a primary dope. Note that in the dissolving, the heating and the cooling were made so as to increase the dissolubility. Further, the primary dope, the mixture solvent and the UV-absorbing agent (for example, benzotriazol type compound) are mixed and dissolved to obtain a UV-absorbing agent liquid (hereinafter first additive liquid). Further, the primary dope, the mixture solvent and the matting agent are mixed and dispersed to obtain a matting agent liquid (hereinafter second additive liquid). Further, as to the object, another additive liquid containing the deterioration inhibitors, optical anisotropy controlling agent, a dye and a peeling agent may be prepared.

After the preparation of the primary dope and the additive liquids, in order to remove the impurities, a filtration is preferably made by a filtration apparatus. Preferably, the filtration apparatus includes a filter, whose averaged pore diameter is at most 100 μm, and performs the filtration at 50 L/hr flow rate of the filtration. Thereafter, foam is preferably removed from the primary dope and the additive liquids.

Methods for dissolving and adding materials, raw materials and additives, filtrating, and removing the voids, are explained in Japanese Patent Application No. 2004-264464. The description of this publication can be applied to the present invention.

In FIG. 1, a film production apparatus 10 includes a stock tank 11 containing the first additive liquid 12, a stock tank 13 containing the second additive liquid 14, and a stock tank 15 containing a primary dope 16. The stock tanks 11, 13, 15 are respectively provided with pumps 17, 18, 19 for feeding the first additive liquid 12, the second additive liquid 14 and the primary dope 16 therein.

After mixing the first additive liquid 12 and the second additive liquid 14, they are fed through a static mixer 20 such that a uniform added liquid. Then, the added liquid is added to the primary dope 16 and the mixture is fed through a static mixer 21. Thus a uniform solution is obtained as a casting dope. After the filtration with use of a filtration apparatus 22, the casting dope is fed to a casting die 30.

Below the casting die 30, there is a belt 33 supported by rollers 31, 32. The belt 33 endlessly and circulatory move in accordance with a rotation of the rollers 31, 32 by a driving device (not shown). The moving speed of the belt 33, namely a casting speed is preferably in the range of 10 m/min to 200 m/min. Furthermore, the rollers 31, 32 are connected to a heat transfer medium circulator 34 for keeping a surface temperature of the belt 33 to a predetermined value. In each roller 31, 32, there is a heat transfer passage in which a heat transfer medium of the predetermined temperature is fed, so as to keep the temperature of the rollers 31, 32 to the predetermined value. Thus the surface temperature of the belt 33 is controlled to the predetermined value. Note that the surface temperature is preferably from −20° C. to 40° C.

The casting die 30, the belt 33 and the like are contained in a casting chamber 35 to which a temperature regulator 36 is connected. The temperature in the casting chamber 35 is preferably in the range of −10° C. to 57° C. Further, a condenser 37 is provided for concentrating a solvent vapor. The concentrated organic solvent is recovered into a recovering device 38, and the reproduction is made for reusing as the solvent for preparing the dope.

The casting die 30 casts the casting dope on the belt 33 to form a casting film 39, while the casting dope form a bead above the belt 33. Note that the temperature of the casting dope is preferably from −10° C. to 57° C. Further, in order to stabilize the formation of the bead, a decompression chamber 40 is preferably provided in a rear side of the bead, so as to control the pressure. The casting film 39 is fed by the moving belt 33, and at the same time it is preferable to feed a drying air from air blowers 41, 42, 43 such that the organic solvent may evaporate from the casting film 39. Positions of the air feeders are an upper and upstream side, an upper and downstream side, and a lower side of the belt 33. However, the positions are not restricted in this figure. The surface condition of the film sometimes changes when the drying air is applied onto the casting film 39 just after the formation thereof. In order to reduce the change of the surface condition, a wind shielding device 44 is preferably provided. Note that although the belt is used as a support in this figure, a drum may be used as the support. In this case, the surface temperature of the drum is preferably in the range of −20° C. to 40° C.

When having a self-supporting property, the casting film 39 is peeled as a wet film 46 from the belt 33 with support of a peel roller 45. Thereafter, the wet film 46 is transported in an interval section 50 provided with plural rollers. In the interval section 50, a drying air at a predetermined temperature is fed from an air blower 51 such that the drying of the wet film 46 may proceed. The temperature of the drying air is preferably in the range of 20° C. to 250° C. Note that in the interval section 50, the rotational speed of the rollers in the upstream side is faster than those in the downstream side, so as to draw the wet film 46. Thus the wet film 46 is transported in a tenter dryer 60 so as to make the drying, while both side edges are held by the clips.

The wet film 46 becomes a film 61 containing a predetermined content of the solvent in the tenter dryer 60. Then the film 61 is transported into an edge slitting device 62 for slitting off both edge portions of the film 61. The slit edge portions are conveyed to a crusher 63 with use of a cutter blower (not shown). The crusher 63 crushes the both edge portions into tips, which are reused for preparation of the dope in view of the cost. Note that the slitting off the both edge portions of the film may be omitted. However, it is preferable to slit them off somewhere between the casting of the dope and the winding the film.

The film 61 is transported into a drying chamber 66 in which there are at least one pass roller 64 and at least one drive roller (suction roller) 65. The temperature in the drying chamber 66 is not restricted especially, and preferably in the range of 50° C. to 200° C. To control the temperature, a blower 67 supplies air into the drying chamber 66 through an air outlet 67a. The drying of the film 61 in the drying chamber 66 is made with wrapping around the pass roller 64 so as to evaporate the solvent. The drying chamber 66 is provided with an adsorbing device 68 for adsorbing and recovering the solvent vapor. The air from which the solvent vapor is removed is sent as the drying air again. Note that the drying chamber 66 is preferably partitioned into plural partitions so as to vary the drying temperature. Further, it is preferable to provide a pre-drying chamber between the edge slitting device 62 and the drying chamber 66 so as to make the pre-drying of the film 61. In this case, the deformation of the film which is caused by the accelerate increase of the temperature of the film is prevented. Note that the drive roller 65 will be precisely explained later.

The film 61 is transported into a cooling chamber 69, and cooled to a room temperature. Note that a moisture control chamber (not shown) may be provided between the drying chamber 66 and the cooling chamber 69. In the moisture control chamber, an air whose moisture and temperature are controlled is fed toward the film 61. Thus the winding defect of the film is prevented when the film 61 is wound.

It is preferable to provide a compulsory neutralization device (neutralization bar) 80 such that the charged voltage may be in the range of −3 kV to +3 kV in transporting the film 61. In FIG. 1, the neutralization device 80 is disposed in a downstream side from the cooling chamber 69. However, the position of the neutralization device 80 is not restricted in this figure. Further, it is preferable to provide a knurling roller 81 for providing a knurling with an embossing processing. Note that the unevenness in the area in which the knurling is provided is preferably in the range of 1 μm to 200 μm.

At last, the film 61 is wound around a winding shaft 83 in a winding chamber 82. The winding is preferably made with applying a predetermined tension by a press roller 84, and it is preferable to change the tension from a start to an end of the winding little by little. The length of the film 61 to be wound is preferably at least 100 m, and a width thereof is preferably at least 600 mm, and especially from 1400 mm to 1800 mm. However, even if the width is more than 1800 mm, the present invention is effective. Further, in the present invention, the thickness of the film to be produced is in the range of 15 μm to 100 μm.

Figure 2:
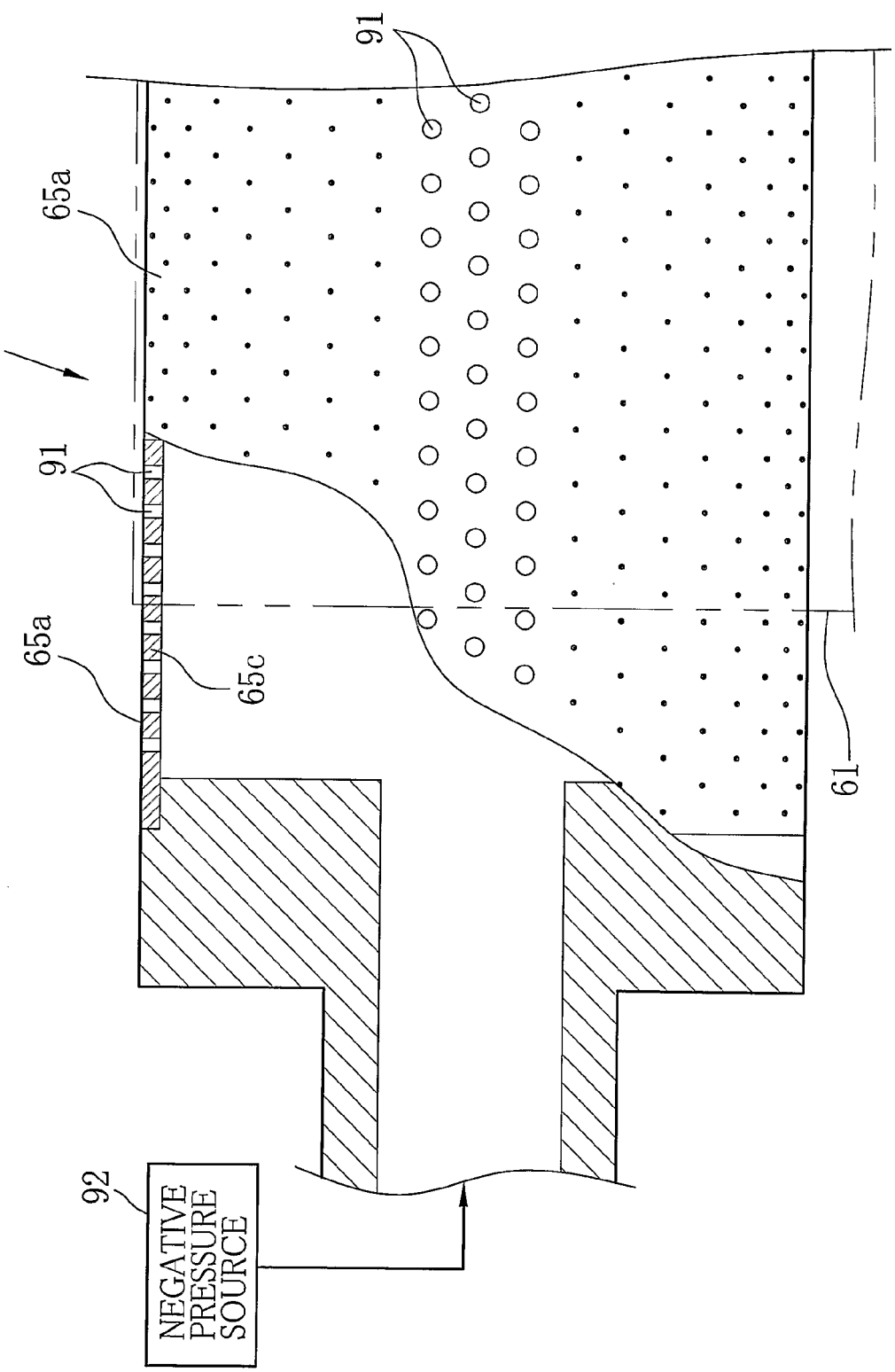
FIG. 2 is a front view of a suction roller of the present application, with a portion thereof broken away for clarity.

As shown in FIG. 2, the suction roller 65 as the drive roller has a plurality of circular suction holes 91 on its entire contact surface. The shape of the suction hole 91 is not limited to the circle, as long as the suction hole 91 has suction power to enable sucking and feeding the film 61. For example, square or other shapes of holes or slits extending in a roller axis direction may be used as the suction hole 91. The suction roller 65 is connected to a negative pressure source 92 such as a suction pump. The negative pressure source 92 sucks the air through the suction holes 91 to suck the film 61 on the suction roller 65 and feed the film 61 with keeping the film on the correct position of the suction roller 65. The suction power of the negative pressure source 92 is preferably in a range of 0.5 kPa to 10 kPa, particularly in a range of 1 kPa to 5 kPa, and especially in a range of 2 kPa to 4 kPa. Since the film 61 is fed while being sucked by the appropriate suction power, the slippage of the film 61 is prevented so as to reduce formation of scratch and crease on the film 61.

Figure 4:
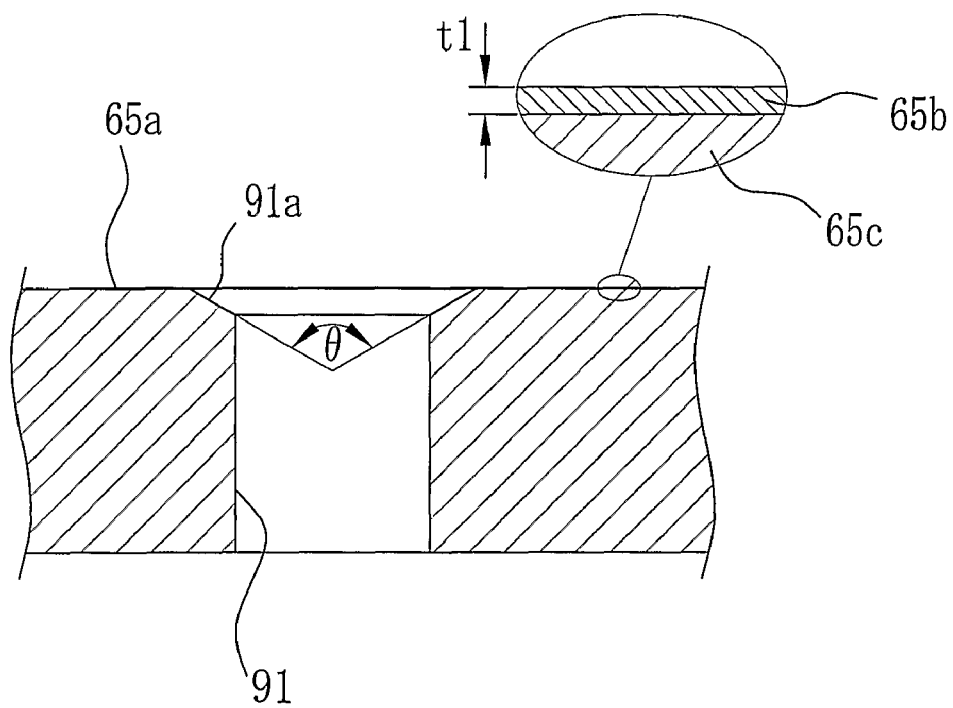
FIG. 4 is a fragmentary cross-sectional view taken along line IV-IV in FIG. 3.

A roller surface 65a of the suction roller 65 is hardened by chrome plating such that a hardened surface layer 65b is formed around a roller body 65c (see FIG. 4). The degree of hardness is in a range of 500 to 2000, preferably in a range of 800 to 1200 in Vickers hardness. In addition, surface roughness Ry of the roller surface 65a is preferably in a range of 0.3 μm to 1.0 μm, particularly in a range of 0.5 μm to 0.8 μm. In the present invention, the surface roughness Ry is the distance between the maximum peak height and the maximum valley depth from the mean line of the roughness profile within a sampling length 1. The value of the surface roughness Ry is measured in area of the roller surface 65 without the suction hole 91. Note that the hardening may be performed by nitridation, quenching or the like instead of the chrome plating. Although aluminum or SUS is used as the material which forms the roller body 65c, the material is not limited to these metals.

Figure 3:
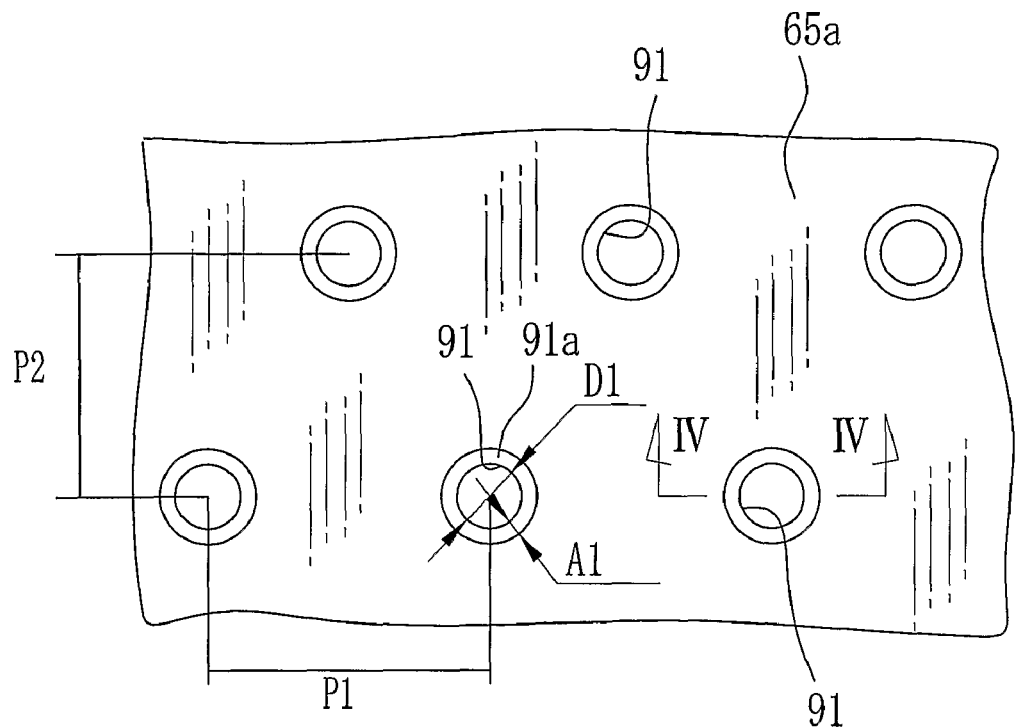
FIG. 3 is an enlarged plan view showing a portion of a surface of the suction roller.

As shown in FIG. 2 and FIG. 3, a diameter of the suction hole 91 is preferably in a range of 1 mm to 6 mm, particularly in a range of 2 mm to 4 mm. A pitch P1 of the holes 91 is preferably in a range of 0.3 mm to 30 mm, and a pitch P2 is preferably in a range of 0.5 mm to 80 mm. In the present invention, the pitch P1 is a distance between centers of adjacent suction holes 91 in a longitudinal direction of the suction roller 65, and the pitch P2 is a distance between centers of adjacent suction holes 91 in a radial direction of the suction roller 65. An opening ratio [(total opening area of the suction holes 91/total area for forming the suction holes 91)×100] is preferably in a range of 5% to 30%. Note that a chamfered edge of the suction hole 91 is shown by numeral 91a.

As shown in FIG. 4, the suction hole 91 with the chamfered edge 91a is formed by punching or the like. Accordingly, the formation of microscopic scratch on the film 61 can be further reduced. As shown in FIG. 3, a width of chamfer Al of the suction hole 91 is preferably in a range of 2% to 20% in ratio to the diameter Dl. In addition, an inside chamfer angle θ of the chamfered edge 91a is preferably in a range of 80° to 170°. Note that the chamfered edge 91a may be formed by cutting, instead of press such as the punching.

Figure 5:
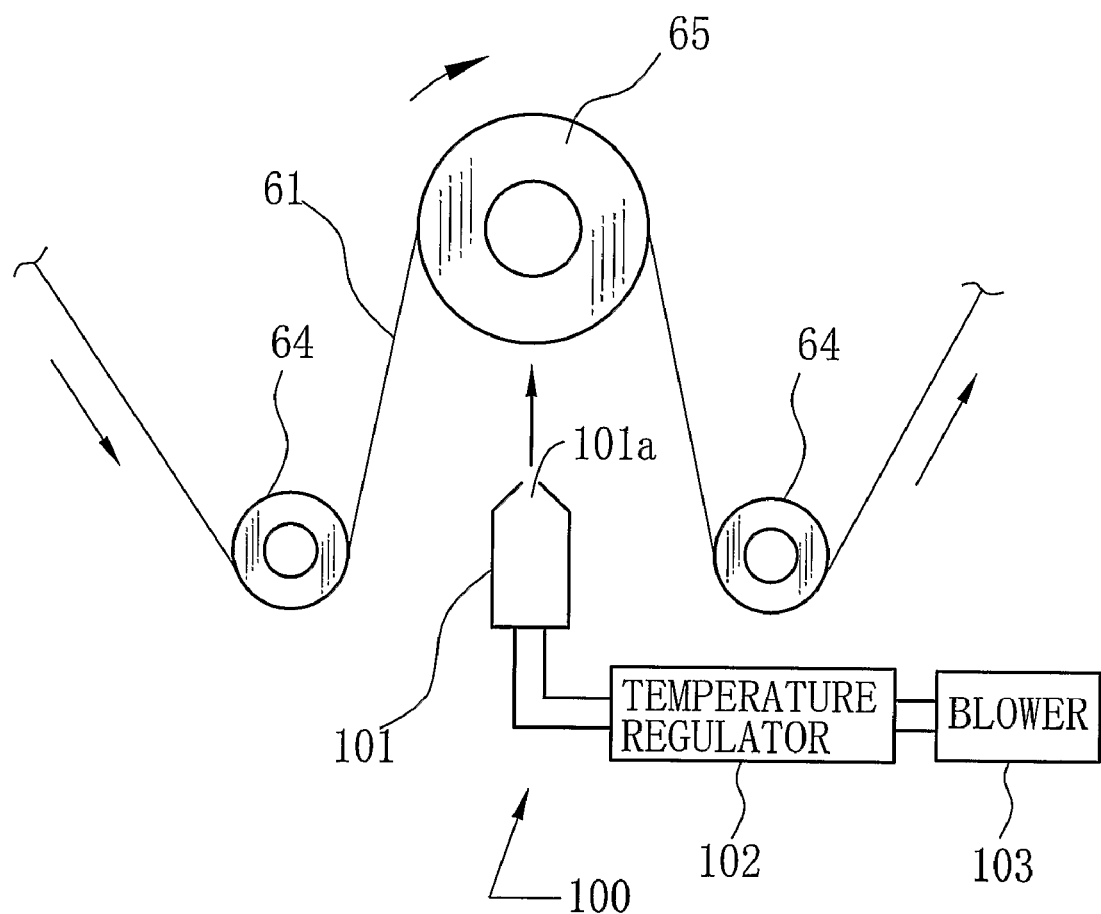
FIG. 5 is a schematic diagram of a roller temperature controller for the suction roller.

As shown in FIG. 5, a roller temperature controller 100 is provided for keeping a temperature of the contact surface (surface temperature) of the suction roller 65 constant. The roller temperature controller 100 includes at least one fan duct 101 having an air outlet 101a for controlling the surface temperature of the suction roller 65, which corresponds to the single suction roller 65. The roller temperature controller 100 controls the surface temperature of the suction roller 65 so as to be higher than temperature of the film immediately before contacting to the suction roller 65. The fan duct 101 is connected to a temperature regulator 102 and a blower 103 so that the air which temperature is controlled blows the suction roller 90. Note that the disposition and the number of the air outlet 101a are not limited to the figure. In addition, instead of the temperature control by the air supply, heating medium may circulate in the suction roller for controlling the surface temperature thereof so as to be higher than temperature of the film. The difference of the temperatures between the surface of the suction roller 65 and the film 61 immediately before contacting to the suction roller 65 is preferably in a range of 1° C. to 30° C., particularly in a range of 5° C. to 15° C.

The solution casting method of the present invention may be a co-casting method in which a co-casting of two or more sorts of the dopes are made such that the dopes may form a multi-layer film, or a sequentially casting method in which two or more sorts of the dopes are sequentially cast so as to form the multi-layer film. When the co-casting is performed, a feed block may be attached to the casting die, or a multi-manifold type casting die may be used. A thickness of each upper and lowermost layer of the multi-layer casting film on the support is preferably in the range of 0.5% to 30% to the total thickness of the multi-layer casting film. Furthermore, in the co-casting method, when the dopes are cast onto the support, it is preferable that the lower viscosity dope may entirely cover over the higher viscosity dope. Furthermore, in the co-casing method, it is preferable that the inner dope is covered with dopes whose alcohol contents are larger in the bead from a die to the support.

Note that Japanese Patent Application No. 2004-264464 teaches in detail the structure of the casting die and the support, drying conditions in each processes (such as the co-casting, the peeling and the stretching), a handling method, a winding method after the correction of planarity and curling, a recovering method of the solvent, a recovering method of film and the like. The description of the above publication may be applied to the present invention.

[Characteristics, Measuring Method]

This application No. 2004-264464 teaches the characteristics and the measuring method of the cellulose acylate film, which may be applied to the present invention.

[Surface Treatment]

It is preferable to make a surface treatment of at least one surface of the cellulose acylate film. Preferably, the surface treatment is at least one of glow discharge treatment, atmospheric pressure plasma discharge treatment, UV radiation treatment, corona discharge treatment, flame treatment, and acid or alkali treatment.

[Functional Layer]

A primary coating may be made over at least one surface of the cellulose acylate film. Further, it is preferable to provide other functional layers for the cellulose acylate film as a film base so as to obtain a functional material. The functional layers may be at least one of antistatic agent, cured resin layer, antireflection layer, adhesive layer for easy adhesion, antiglare layer and an optical compensation layer.

Conditions and methods of performing a surface treatment and providing a functional layer with several functions and characteristics are described in this application No. 2004-264464.

Preferably, the functional layer contains at least one sort of surface active agent in the range of 0.1 mg/m² to 1000 mg/m². Further, preferably, the functional layer contains at least one sort of lubricant in the range of 0.1 mg/m² to 1000 mg/m². Further, preferably, the functional layer contains at least one sort of matting agent in the range of 0.1 mg/m² to 1000 mg/m². Further, preferably, the functional layer contains at least one sort of antistatic agent in the range of 1 mg/m² to 1000 mg/m².

[Application]

The cellulose acylate film can be used as the protective film in a polarizing filter. To obtain a LCD, two polarizing filters, in each of which the cellulose acylate film is adhered to a polarizer, are disposed so as to sandwich a liquid crystal layer. The application No. 2004-264464 discloses TN type, STN type, VA type, OCB type, reflection type, and other example in detail. To these types can be applied the film of the present invention. Further, the application teaches the cellulose acylate film provided with an optical anisotropic layer and that provided with antireflective and antiglare functions. Furthermore, the application supposes to provide the cellulose acylate film with adequate optical functions, and thus a biaxial cellulose acylate film is obtained and used as the optical compensation film, which can be used as the protective film in the polarizing filter simultaneously. The restriction thereof described in the application No. 2004-264464 can be applied to the present invention.

In addition, a cellulose triacetate film (TAC film) having superior optical characteristics can be obtained according to the present invention. The TAC film can be used as a base film of a photosensitive material or a protective film in a polarizing filter. The TAC film is also used as an optical compensation film for widening a view angle of a liquid crystal display used for a TV monitor. In this case, preferably the TAC film also has the function of the protective film in the polarizing filter. Accordingly, the TAC film can be used for an IPS (In-Plane Switching) mode, an OCB (Optionally Compensatory Bend) mode, a VA (Vertically Aligned) mode and the like as well as for a conventional TN (Twisted Nematic) mode.

EXAMPLE

Example of the present invention was explained. However, the present invention was not restricted in the example. In this example, Experiments 1-8 were performed. The explanation of Experiment 1 of the present invention was made in detail, and the same explanations of Experiments 2-8 of the preset invention were omitted. Further, the conditions and the results of the examinations were respectively shown in Table 1.

To produce the cellulose acetate film, materials described below were mixed and stirred by the static mixer 21 for dissolution, and filtered by the filtration apparatus 22 so as to become the casting dope:

cellulose triacetate: 20 pts.mass.;
methylacetate: 58 pts.mass.;
acetone: 5 pts.mass.;
methanol: 5 pts.mass.;
ethanol: 5 pts.mass.;
butanol: 5 pts.mass.;
plasticizer A (ditrimethylol propane tetra acetate): 1.2 pts.mass.;
plasticizer B (triphenyl phosphate): 1.2 pts.mass.;
UV absorbing agent a (2,4-bis-(n-octylthio)-6-(4-hydroxy-3, 5-di-tert-butylanilino)-1,3,5-triadine): 0.2 pts.mass.;
UV absorbing agent b (2(2'-hydroxy-3',5'-di-tert-butylphenyl)-5-chlorobenzotriazol): 0.2 pts.mass.;
UV absorbing agent c (2(2'-hydroxy-3',5'-di-tert-amylphenyl)-5-chlorobenzotriazol): 0.2 pts.mass.;
peeling agent a ($C_{12}H_{25}OCH_2CH_2O$—P(=O)—$(OK)_2$): 0.02 pts.mass.;
peeling agent b (citric acid): 0.02 pts.mass.; and
micro particles (silicon dioxide(20 nm diameter, Mohs hardness approximately 7)): 0.05 pts.mass.

The outside diameter of the suction roller 65 is 400 mm, and the width thereof is 2000 mm. The casting was made with regulating a flow rate of the casting dope from the casting die 30, such that the thickness of the produced film 61 might be 80 μm and the width of the casting might be 1500 mm.

At producing the film, the temperatures of the casting die 30 and pipes are kept to 36° C. Further, the casting die 30 was coathanger type, in which bolts for adjusting the thickness of the film are provided with pitch of 20 mm. Then the adjustment was made with use of the bolts. Thus, in the film except of the 20 mm edge portions, the difference of the thickness at any two points apart at 50 mm was at most 1 μm, and further the difference of the minimal thickness value and the maximal thickness value in the widthwise direction was at most 3 μm. The variation of the film thickness was in the range of ±1.5% to the predetermined film thickness.

In a primary side from the casting die 30, the decompression chamber 40 was disposed, whose decompression rate can be adjustable depending on the casting speed, such that there would be a pressure difference in the range of 1 Pa to 5000 Pa between up- and downstream sides. Further, the temperature of the decompression chamber was also regulated. there was labyrinth packing (not shown) in front and rear sides of the bead. Further, there were openings in both sides. Further, in order to compensate the disorder of the both edges of the casting beads, an edge suctioning device (not shown) was used.

The material of the casting die 30 was a precipitation hardened stainless or a stainless having double-layer structure. The material had coefficient of thermal expansion of at most $2\times10^{-5}(°C.^{-1})$, the almost same anti-corrosion properties as SUS316 in examination of corrosion in electrolyte aqua solution. Further, when the material was dipped in a mixture liquid of dichloromethane, methanol and water, pitting (holes) were not formed on the gas-liquid interface. The surface roughness Ry of a contacting surface of the casting die 30 to the dope was at most 1 μm, a straightness was at most 1 μm/m in each direction, and the clearance of the slit was automatically controlled in the range of 0.5 mm to 3.5 mm. In this embodiment, the slit clearance was 1.5 mm. An end of the contacting portion of each lip to the dope was processed so as to have a chamfered radius at most 50 μm through the slit. In the die, the shearing speed was in the range of 1(1/sec) to 5000(1/sec).

Further, lip ends are provided with a hardened layer. In order to provide the hardened layer, there are methods of ceramic coating, hard chrome plating, nitriding treatment and the like. If the ceramics is used as the hardened layer, the grind was possible, the porosity becomes lower, and was not friable and the good corrosion resistance. Further, as the preferable ceramics, there was no adhesive property to the dope. Concretely, as the ceramics, there are tungsten carbide, $Al_2O_3$, TiN, $Cr_2O_3$ and the like, and especially tungsten carbide. Note in the present invention the hardened layer was formed by a tungsten carbidecoating in a spraying method.

On the both edges of a die slit, the discharged dope is partially dried to be a solid. In order to prevent the solidification of the dope, a mixture solvent to which the dope was dissoluble was supplied at 0.5 ml/min to each bead edge and the air-liquid interface of the slit. The pump for supplying the dope has a pulsation at most 5%. Further, the pressure in the rear side (or the upstream side) of the bead was decreased by 150 Pa. Further, in order to make the temperature in the decompression chamber 40 constant, a jacket (not shown) was provided. Into the jacket, a heat transfer medium whose temperature was regulated to 40° C. was fed. The airflow of the edge suctioning was in the range of 1 L/min to 100 L/min, and in this embodiment, the air flow rate was regulated in the range of 30 L/min to 40 L/min.

The belt 33 was a stainless endless belt that was 2.0 m in width and 70 m in length. The thickness of the belt 33 was 1.5 mm and the polishment was made such that a surface roughness Ry was at most 0.05 μm. The material was SUS 316 and had enough corrosion resistance and strength. The thickness unevenness of the belt 33 was at most 0.5%. The belt 33 was rotated by drive of two rollers 31, 32. The difference of the relative speed of the rollers 31, 32 and the belt 33 was at most 0.01 m/min. Further, the velocity fluctuation of the belt 33 was at most 0.5%. The rotation was regulated with detecting the positions of both edges such that the film meandering in widthwise direction for one rotation might be regulated to at most 1.5 mm. Further, the positional fluctuation in horizontal directions of the lips and the belt 33 just below the casting die 30 was at most 200 μm.

Into the rollers 31, 32 are fed the heat transfer medium so as to perform the temperature regulation of the belt 33. Into the roller 31 in a side of the casting die 30 was fed the heat transfer medium (liquid) at 20° C. and into the roller 32 was fed the heat transfer medium (liquid) at 40° C. The surface temperature of the middle portion of the belt 33 just before the casting was 15° C., and the temperature difference between both side edges was at most 6° C. Note that the belt 33 preferably had no defect on surface, and especially preferably, the number of pinholes whose diameter was at least 30 μm was zero, that of the pinholes whose diameter was from 10 μm to 30 μm was 1 per 1 m², and that of the pinholes whose diameter was less than 10 μm was 2 per 1 m².

The temperature of the casting chamber 35 was kept to 35° C. The dope 33 is cast onto the belt 33 to form the casting film 39, to which the drying air of parallel flow to the casting film 39 was fed at first to dry. Airs were fed from the air blowers 41-43 such that the temperature of the drying air might be 135° C. in an upper and upstream side, 140° C. in an upper and downstream side, and 65° C. in a lower side. The saturated temperature of each drying wind was about −3° C. Then the wet film 46 was peeled from the belt 33. In order to reduce the peeling defect, the peeling speed to the moving speed of the belt was 100.5%. The solvent vapor generated by the drying was condensed by the condenser 37 and then recovered by the recovery device 38. The drying air from which the solvent vapor was removed was heated again and reused as the drying air. The wet film 46 was transported in the interval portion 50 with use of at least one roller toward the tenter dryer 60. At the same time, the water content in the solvent was regulated to at most 0.5% to reuse the solvent. During the transporting in the interval portion 50, the drying air at 70° C. was fed from the air blower 51 so as to further dry out the wet film 46.

The wet film 46 transported into the tenter dryer 60 was dried by the heating air of 140° C. which was controlled such that a wind speed in the widthwise direction might be constant, and fed out into a normal direction of the film through nozzles (not shown) disposed with spaces among them. After that, the wet film 46 was fed out as the film 61 from the tenter dryer 60.

Then, the edge slitting of both edge portions was made in 30 seconds after exit from the tenter dryer 60. Before drying at the high temperature in the drying chamber 66 which will be explained later, the preheating of the film 61 was made in a predrying room (not shown) into which the drying air at 100° C. was fed.

The film 61 was dried at high temperature in the drying chamber 66 in which the at least one pass roller 64 and at least one suction roller 65 are provided. The surface material of the pass roller 64 and the suction roller 65 was SCS13 (in experiment 1 and 2), and HCr (in experiment 3 to 8) formed by chrome plating. The diameter D1 of the plural suction holes 91 on the suction roller 65 were 4 mm (in experiment 1 to 4, 7 and 8), 8 mm (in experiment 5), and 0.8 mm (in experiment 6). The width A1 of the chamfer of the suction hole 91 is 10% (in experiment 1 to 6), 1% (in experiment 7), and 25% (in experiment 8), in ratio to the diameter of the suction hole 91. A film tension in upstream from the suction roller 65 is set at 150N/m, and the film tension in downstream from the suction roller 65 is set at 350N/m. The temperature of the film immediately before contacting to the suction roller 65 was 90° C. The surface temperature of the suction roller 65 was 50° C. (in experiment 1 and 3), and 100° C. (in experiment 2 and 4 to 8). Experiment results will be described below in detail.

The solvent vapor in the drying air was removed by the adsorbing device 68. The adsorptive agent was activated carbon, and the desorption was made with the dried air. Thus the water content of the recovered solvent was made at most 0.3 wt. %, and thereafter the recovered solvent was used for the solvent for preparing the dope. The drying air includes not only the solvent vapor but also other compounds such as plasticizer, UV-absorbing agent and compounds of high boiling points. Therefore the other compounds are removed with cooling by cooling device and a preadsorber, and recycled. Then the adsorption and desorption conditions were set such that VOC (volatile organic compounds) in the exhaust gas might become at most 10 ppm. Both edge portions were slit off and then knurling of the both sides of the film 61 was made by a knurling roller 71. The knurling was performed by embossing process from a side. The pressure of the knurling was regulated, such that averaged width of the knurling might be 10 mm, and the maximal height might be 12 μm larger than the averaged thickness.

Thereafter, the film 61 was transported into the winding chamber 72 in which the temperature was 28° C. and the humidity was 70%. Further, an ionizer (not shown) was disposed in the winding chamber 72 such that the charged voltage might be in the range of −1.5 kV to +1.5 kV. The speed of winding the film 61 is set at 50 m/min.

Experiment 1

In Experiment 1, the suction roller 65 whose surface is not hardened is used. The surface material of the suction roller 65 was SCS13, the surface hardness is 150 in Vickers hardness, the surface roughness Ry is 0.6 μm, the diameter D1 of the suction hole is 4 mm, and the width A1 of chamfer of the suction hole is 10%. The film is continuously produced for 24 hours in the conditions that the film temperature immediately before contacting to the suction roller is 90° C., the suction power of the suction roller 65 is 2.0 kPa, and the surface temperature of the suction roller 65 is 50° C.

Experiment 2

In Experiment 2, the film is continuously produced for 24 hours in the same conditions as Experiment 1, with the exception that the surface temperature of the suction roller 65 is 100° C.

Experiment 3

In Experiment 3, the film is continuously produced for 24 hours in the same conditions as Experiment 1, with the exception that the surface material of the suction roller 65 is SUS304 which has the hardened layer formed by the hard chrome plating. The thickness t1 of the hardened layer 65b is 50 μm.

Experiment 4

In Experiment 4, the film is continuously produced for 24 hours in the same conditions as Experiment 3, with the exception that the surface temperature of the suction roller 65 is 100° C.

Experiment 5

In Experiment 5, the film is continuously produced for 24 hours in the same conditions as Experiment 4, with the exception that the diameter D1 of the suction hole 91 is 8 mm.

Experiment 6

In Experiment 6, the film is continuously produced for 24 hours in the same conditions as Experiment 4, with the exception that the diameter D1 of the suction hole 91 is 0.8 mm.

Experiment 7

In Experiment 7, the film is continuously produced for 24 hours in the same conditions as Experiment 4, with the exception that the width A1 of chamfer A1 of the suction hole 91 is 1%.

Experiment 8

In Experiment 8, the film is continuously produced for 24 hours in the same conditions as Experiment 4, with the exception that the width of chamfer A1 of the suction hole 91 is 25%.

[Evaluation Method]

Quality of the produced film is evaluated in two factors which are presence of film flaws and presence of film deformation. In addition, force for holding the film while the feeding of the film is also evaluated.

[Evaluation of Film Flaws]

A sample film is clipped from the produced film 61, and the sample film is set in a display. The film is determined as x in case that flaw of the film is confirmed by visual check when a backlight illuminates the film at normal brightness. The film is determined as Δ in case that flaw of the film is confirmed by visual check when the backlight illuminates the film at high brightness. The film is determined as ○ in case that no flaw of the film is confirmed by visual check when the backlight illuminates the film at high brightness.

[Evaluation of Film Deformation]

A sample film having 2 meter length in its longitudinal direction is cut off from the produced film 61. The film is determined as x in case that hole-deformation of the film is confirmed by visual check when the film is spread on a table to check planarity thereof.

[Evaluation of Power for Holding Film]

The film tension in upstream from the suction roller 65 is set at 100N/width, and the film 61 is fed at a speed of 30 m/min with gradually increasing the film tension in downstream from the suction roller. At the time when the film 61 starts slipping on the suction roller 65, the difference of the film tension between the upstream and downstream from the suction roller 65 is calculated and used for evaluating the holding power of the suction roller for holding film. The slippage of the film 61 on the suction roller 65 is detected by monitoring the rotating speed of the suction roller 65.

Based on above described evaluation method, Experiments 1 to 8 are evaluated. The results are shown in table 1. The detailed explanations for the results are described below.

TABLE 1

| | Conditions of the suction roller | | | | | Evaluation | | |
|---|---|---|---|---|---|---|---|---|
| | | Ry | ST | FT | DH | WC | | | |
| | SM | (μm) | (° C.) | (° C.) | (mm) | (%) | FF | FD | HF |
| Ex. 1 | SCS13 | 0.6 | 50 | 90 | 4 | 10 | x | ○ | ○ |
| Ex. 2 | SCS13 | 0.6 | 100 | 90 | 4 | 10 | Δ | ○ | ○ |
| Ex. 3 | HCr | 0.6 | 50 | 90 | 4 | 10 | ○ | ○ | ○ |
| Ex. 4 | HCr | 0.6 | 100 | 90 | 4 | 10 | ○ | ○ | ○ |
| Ex. 5 | HCr | 0.6 | 100 | 90 | 8 | 10 | ○ | x | ○ |

TABLE 1-continued

| | Conditions of the suction roller | | | | | Evaluation | | |
|---|---|---|---|---|---|---|---|---|
| | Ry | ST | FT | DH | WC | | | |
| SM | (μm) | (° C.) | (° C.) | (mm) | (%) | FF | FD | HF |
| Ex. 6 HCr | 0.6 | 100 | 90 | 0.8 | 10 | x | ○ | x |
| Ex. 7 HCr | 0.6 | 100 | 90 | 4 | 1 | x | ○ | ○ |
| Ex. 8 HCr | 0.6 | 100 | 90 | 4 | 25 | ○ | x | ○ |

SM: surface material
Ry: surface roughness Ry
ST: surface temperature
FT: temperature of film immediately contacting to suction roller
DH: diameter of suction hole
WC: width of chamfer of suction hole
FF: film flaws
FD: film deformation
HF: force for holding film As shown in Table 1, in Experiment 1, the result is good (○) in the film deformation and in the force for holding film. However, flaws on the film are confirmed by visual check when the backlight illuminates the film at normal brightness (x). In Experiment 2, the result is good (○) in the film deformation and in the force for holding film. However, flaws on the film are confirmed by visual check when the backlight illuminates the film at high brightness (Δ). In Experiment 3, no film flaws and film deformation is confirmed (○), and the result is also good (○) in the force for holding film. Accordingly, the film obtained in Experiment 3 has satisfactory properties to be used for the liquid crystal display and the like. Also in Experiment 4, no film flaws and film deformation is confirmed (○), and the result is good (○) in the force for holding film. In Experiment 5, no film flaw is confirmed (○), but the hole-deformation in the film 61 is confirmed (x). The result is also good (○) in the force for holding film. In Experiment 6, no film deformation is confirmed (○), but the result is bad (x) in the film flaws and the force for holding film. In Experiment 7, the result is good (○) in the film deformation and in the force for holding film. However, flaws on the film are confirmed by visual check when the backlight illuminates the film at normal brightness (x). In Experiment 8, no film flaw is confirmed (○), but the hole-deformation in the film 61 is confirmed (x). The result is also good (○) in the force for holding film.

[Effect of Hardening Process]

The only difference between Experiments 1 and 3 is the surface material of the suction roller 65. The surface material is SCS13 in Experiment 1, and is HCr in Experiment 3. Therefore, the difference of the results of Experiments 1 and 3 shows the effect of the surface material of the suction roller 65 on the quality of the film 61. In Experiment 1, the result is good (○) in the film deformation and in the force for holding film. However, flaws on the film are confirmed (x). In contrast, in Experiment 3, the result is good (○) in the film flaws, in addition in the film deformation and in the force for holding film. Also, the only difference between Experiments 2 and 4 is the surface material of the suction roller 65. The surface material is SCS13 in Experiment 2, and is HCr in Experiment 4. Therefore, the difference of the results of Experiments 2 and 4 also shows the effect of the surface material of the suction roller 65 on the quality of the film 61. In Experiment 2, the result is good (○) in the film deformation and in the force for holding film. However, slight flaws on the film are confirmed (Δ). In contrast, in Experiment 4, the result is good (○) in the film flaws, in addition in the film deformation and in the force for holding film. These facts show that the difference of the surface material of the suction roller 65 (whether the hardening process is applied or not) affects the quality of the produced film 61, and the suction roller 65 on which the hardening process is applied is preferable for producing the film without having defects.

[Difference of Diameter of Suction Hole]

The only difference among Experiments 4 to 6 is the diameter of the suction hole 91. The diameter D1 is 4 mm in Experiment 4, 8 mm in Experiment 5, and 0.8 mm in Experiment 6. Therefore, the difference of the results of Experiments 4 to 6 shows the effect of the diameter of the suction hole 91 on the quality of the film 61. In Experiment 4, the good results (○) are obtained in all of the film flaws, film deformation and the force for holding film. In contrast, in Experiment 5, the result is good (○) in the film flaws and in the force for holding film. However, deformation is confirmed on the film (x). In Experiment 6, the result is good (○) in the film deformation. However, flaws are confirmed on the film (x), and the force for holding film is insufficient (x). These facts show that the difference of the diameter D1 of the suction hole 91 affects the quality of the produced film 61, and the suction hole 91 having the diameter in the range of 1 mm to 6 mm is preferable for producing the film without having defects.

[Difference of Width of Chamfer of Suction Hole]

The only difference among Experiments 4, 7, 8 is the width A1 of chamfer of the suction hole 91. The width A1 of chamfer is 10% in Experiment 4, 1% in Experiment 7, and 25% in Experiment 8. Therefore, the difference of the results of Experiments 4, 7, 8 shows the effect of the width of chamfer of the suction hole 91 on the quality of the film 61. In Experiment 4, the good results (○) are obtained in all of the film flaws, film deformation and the force for holding film. In contrast, in Experiment 7, flaws on the film are confirmed (x), although the result is good (○) in the film deformation and in the force for holding film. In Experiment 8, deformation is confirmed on the film (x), although the result is good (○) in the film flaws and in the force for holding film. These facts show that the difference of the width A1 of chamfer of the suction hole 91 affects the quality of the produced film 61, and the suction hole 91 having the width of chamfer in the range of 2% to 20% is preferable for producing the film without having defects.

[Difference of Surface Temperature of Suction Roller]

The only difference between Experiments 1 and 2, in which the suction roller 65 having the surface not being hardened is used, is the surface temperature of the suction roller 65. The surface temperature is 50° C. in Experiment 1, and 100° C. in Experiment 2. Therefore, the difference of the results of Experiments 1 and 2 shows the effect of the surface temperature of the suction roller 65 on the quality of the film 61. In Experiment 1, the result is good (○) in the film deformation and in the force for holding film. However, many flaws on the film are confirmed (x). In contrast, in Experiment 2, the result is good (○) in the film deformation and in the force for holding film. However, slight flaws on the film are confirmed (Δ). Also, the only difference between Experiments 3 and 4, in which the suction roller 65 having the hardened surface is used, is the surface temperature of the suction roller 65. The surface temperature is 50° C. in Experiment 3, and 100° C. in Experiment 4. Therefore, the difference of the results of Experiments 3 and 4 shows the effect of the surface temperature of the suction roller 65 on the quality of the film 61, when the suction roller 65 has the hardened surface. However, both in Experiment 3 and Experiment 4, the good results (○) are obtained in all of the film flaws, film deformation and the force for holding film. This is attributed to the fact that the use of the suction roller 65 having the hardened surface prevents the film from having defects such as the film flaws. These facts show that the difference of the surface temperature of the suction roller 65 affects the quality of the produced film 61, especially when the suction roller 65 has the surface not being hardened. In addition, these result show that to produce the film 61 without having defects, it is preferable that the surface temperature of the roller is higher than the film temperature.

INDUSTRIAL APPLICABILITY

The present invention is applicable to a method for producing a polymer film used as a protective material or an optical material for a liquid crystal display and the like. Especially, the present application is preferably applicable to a cellulose acylate film or a cellulose triacetate film which is used as a protective film in a polarizing filter and the like.

The invention claimed is:

1. A solution casting method of a film comprising steps of:
casting a dope onto a support to form a casting film;
peeling said casting film as a film; and
drying said film with transporting said film by at least one drive roller whose surface has a hardness in a range of 550 to 1200 in Vickers hardness,
wherein said surface of said one drive roller is hardened by plating,
wherein said drive roller is a suction roller having a plurality of suction holes on a surface thereof,
wherein each of said suction holes is circular and has a diameter in a range of 1 mm to 6 mm, and
wherein each of said suction holes has a chamfered edge whose width Al is in a range of 2% to 20% in ratio to said diameter.

2. A solution casting method described in claim 1, wherein said surface of said drive roller has a surface roughness Ry in a range of 0.3 μm to 1.0 μm.

3. A solution casting method described in claim 1, a surface temperature of said drive roller being controlled by at least one roller temperature controller during said drying step, so as to be higher than a temperature of said film immediately before contacting to said drive roller.

4. A suction roller having a plurality of circular suction holes on its surface for sucking and transporting a film in a film production apparatus, wherein said surface of said suction roller has a hardness in a range of 550 to 1200 in Vickers hardness and a surface roughness Ry in a range of 0.3 μm to 1.0 μm, and said suction hole has a diameter in a range of 1 mm to 6 mm and a chamfered edge whose width Al is in a range of 2% to 20% in ratio to said diameter, and wherein said surface of said suction roller is hardened by plating.

5. The solution casting method described in claim 1, wherein a ratio of total opening area of said plurality of suction holes to total area for forming said plurality of suction holes is in a range of 5% to 30%.

6. The suction roller described in claim 4, wherein a ratio of total opening area of said plurality of circular suction holes to total area for forming said plurality of circular suction holes is in a range of 5% to 30%.

* * * * *